(12) United States Patent
Sumida

(10) Patent No.: US 11,094,986 B2
(45) Date of Patent: Aug. 17, 2021

(54) POWER STORAGE UNIT

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Tatsuya Sumida, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 170 days.

(21) Appl. No.: 16/488,104

(22) PCT Filed: Feb. 7, 2018

(86) PCT No.: PCT/JP2018/004150
§ 371 (c)(1),
(2) Date: Aug. 22, 2019

(87) PCT Pub. No.: WO2018/155182
PCT Pub. Date: Aug. 30, 2018

(65) Prior Publication Data
US 2020/0067033 A1 Feb. 27, 2020

(30) Foreign Application Priority Data
Feb. 27, 2017 (JP) .............. JP2017-034627

(51) Int. Cl.
*H01M 50/148* (2021.01)
*H01M 10/42* (2006.01)
(Continued)

(52) U.S. Cl.
CPC ....... *H01M 50/148* (2021.01); *H01M 10/425* (2013.01); *H01M 10/44* (2013.01); *H01M 50/116* (2021.01); *H01M 50/20* (2021.01)

(58) Field of Classification Search
CPC .. H01M 50/148; H01M 50/20; H01M 50/116; H01M 10/425; H01M 10/44
See application file for complete search history.

(56) References Cited

U.S. PATENT DOCUMENTS

2012/0064383 A1* 3/2012 Tonomura ............. H01M 50/20
429/99
2017/0311433 A1 10/2017 Sumida et al.
(Continued)

FOREIGN PATENT DOCUMENTS

JP 2014-082844 A 5/2014
JP 2014-143042 A 8/2014
(Continued)

OTHER PUBLICATIONS

International Search Report, Application No. PCT/JP2018/004150, dated May 1, 2018. ISA/Japan Patent Office.

*Primary Examiner* — Stewart A Fraser
(74) *Attorney, Agent, or Firm* — Honigman LLP

(57) ABSTRACT

A power storage unit 1 in which a power storage element is housed in a metal case and which is to be attached to a vehicle via a metal bracket includes a holder that holds the power storage element within the metal case, a bracket receiving portion that is provided in the holder and is to be engaged with the bracket and transmit the load of the holder and the power storage element to the bracket, and a connection piece that is provided in the metal case and is to come into contact with the bracket and electrically connect the metal case to the bracket.

12 Claims, 10 Drawing Sheets

(51) Int. Cl.
*H01M 10/44* (2006.01)
*H01M 50/20* (2021.01)
*H01M 50/116* (2021.01)

(56) References Cited

U.S. PATENT DOCUMENTS

2018/0069214 A1 3/2018 Kuboki et al.
2018/0308634 A1 10/2018 Shimizu et al.

FOREIGN PATENT DOCUMENTS

| JP | 2014-236037 A | 12/2014 |
| JP | 2014-239095 A | 12/2014 |
| JP | 2016-039096 A | 3/2016 |

\* cited by examiner

POWER STORAGE UNIT

CROSS-REFERENCE TO RELATED APPLICATIONS

This application is the U.S. national stage of PCT/JP2018/004150 filed on Feb. 7, 2018, which claims priority of Japanese Patent Application No. JP 2017-034627 filed on Feb. 27, 2017, the contents of which are incorporated herein.

TECHNICAL FIELD

The present specification discloses a technology relating to a power storage unit.

BACKGROUND

A power storage unit disclosed in JP 2016-088144A, for example, is known as a power storage unit in which a holder that holds a plurality of power storage elements is housed in a metal case. In this technology, a bracket is fastened to the metal case using a metal screw, and the power storage unit is fixed to a vehicle while also being electrically connected to the ground of the vehicle, via the bracket and the screw.

DISCLOSURE

However, with this configuration, the screw carries a large load of the power storage elements, and therefore, when the screw is subjected to vibrations from the vehicle, stress is concentrated in the screw, which causes the screw to become loose or the screw itself to be damaged. In order to ensure electrical connection to the vehicle side while avoiding this problem, a configuration is conceivable in which the metal case and the bracket are directly welded to each other, instead of being fastened to each other by using a screw. However, with this configuration, a bracket having a relatively large wall thickness is welded to a metal case having a relatively small wall thickness. For this reason, there are significant technical restrictions, especially in the case where the wall thickness of the bracket is further increased in accordance with the weight of the power storage elements. Moreover, a method is also conceivable in which a partially-reinforced bracket attachment portion is provided in the metal case and the bracket is attached to this bracket attachment portion. However, in this case, the cost of molding the metal case increases.

The present disclosure was completed based on the above-described circumstances, and it is an object thereof to be able to reliably attach a power storage unit to an object, such as a vehicle, that is expected to vibrate, and also secure electrical connection of a metal case of the power storage unit.

SUMMARY

A power storage unit according to a technology disclosed in the present specification is a power storage unit in which a power storage element is housed in a metal case and which is to be attached to a vehicle via a metal bracket, the power storage unit including a holder that holds the power storage element within the metal case, a bracket receiving portion that is provided in the holder and is to be engaged with the bracket and transmit a load of the holder and the power storage element to the bracket, and a connection portion that is provided in the metal case and is to come into contact with the bracket and electrically connect the metal case to the bracket.

With this configuration, the load of the power storage element is transmitted from the holder to the bracket that is engaged with the bracket receiving portion of the holder. Unlike conventional configurations, the load is not transmitted to the bracket via the metal case. Therefore, the generation of excessive stress in a joint portion between the bracket and the metal case can be prevented. Moreover, since the metal case is provided with the connection portion that is to be electrically connected to the bracket, the metal case can be electrically connected to a vehicle body or the like of the vehicle via the bracket. The holder need not be electrically connected to the bracket and therefore need not be produced using a conductive material, and thus the holder can be made of any material that is chosen with higher priority given to strength and production cost.

The following configurations are preferred as embodiments of the power storage unit disclosed in the present specification.

(1) The bracket receiving portion includes a holding groove portion into which an insertion piece portion provided at a leading end of the bracket can be inserted, the connection portion is constituted by a contact piece provided integrated with the metal case, and the contact piece is exposed in the holding groove portion and can come into contact with the insertion piece portion of the bracket inserted and held in the holding groove portion.

With this configuration, an electrical connecting means (contact piece) is exposed within the holding groove portion, which is to hold the bracket, and therefore, can be electrically connected to the bracket while the holder is held by the bracket, by simply inserting the bracket into the holding groove portion.

(2) The bracket receiving portion is provided recessed in a side portion of the holder, the metal case is provided with a wall portion that covers a side wall of the holder from an outer side, the wall portion is provided with a spring piece serving as the contact piece, and the spring piece can enter the holding groove portion from the outer side of the side wall and come into contact with the insertion piece portion of the bracket.

With this configuration, the bracket receiving portion is housed inside the metal case, and is therefore prevented from deforming due to being pressed by another member from the outside.

(3) The metal case is constituted by an upper case and a lower case that cover the outside of the holder by being fitted to each other from opposite sides, the holder is provided with a metal coupling member extending in a direction in which the upper and lower cases are fitted to each other, and the upper case and the lower case are fixed to the holder using a fastening member screwed to the coupling member.

With this configuration, the upper case and the lower case are electrically connected to each other via a metal collar, and thus the upper and lower cases can be made to be at the same electric potential for shielding purposes as well as being fixed to the holder.

(4) A circuit board to which a control circuit that controls charging and discharging of the power storage element is mounted is housed in the metal case, and the circuit board has a through-hole through which the coupling member passes and a land at a circumferential edge of the through-hole, the land being in contact with the coupling member and thereby allowing a predetermined line of the control circuit to be at the same potential as the metal case.

With this configuration, the predetermined line of the circuit board can be made to be at the same potential as the metal case by simply inserting and screwing a threaded member into the collar.

The holder is made of a synthetic resin and has a rectangular box-like shape, and the bracket receiving portion is provided in substantially the middle of each of opposite side wall portions corresponding to the long sides of the holder.

With this configuration, the bracket carries the load of the power storage element and the holder at a location near the center of gravity of the holder. Therefore, the generation of excessive stress between the center of gravity of the holder and the bracket receiving portion can be prevented.

ADVANTAGEOUS EFFECTS OF DISCLOSURE

With a power storage module according to the technology disclosed in the present specification, it is possible to reliably attach a power storage unit to an object, such as a vehicle, that is expected to vibrate, and also secure electrical connection of a metal case of the power storage unit.

DETAILED DESCRIPTION OF PREFERRED EMBODIMENTS

Embodiment 1

Figure 1:
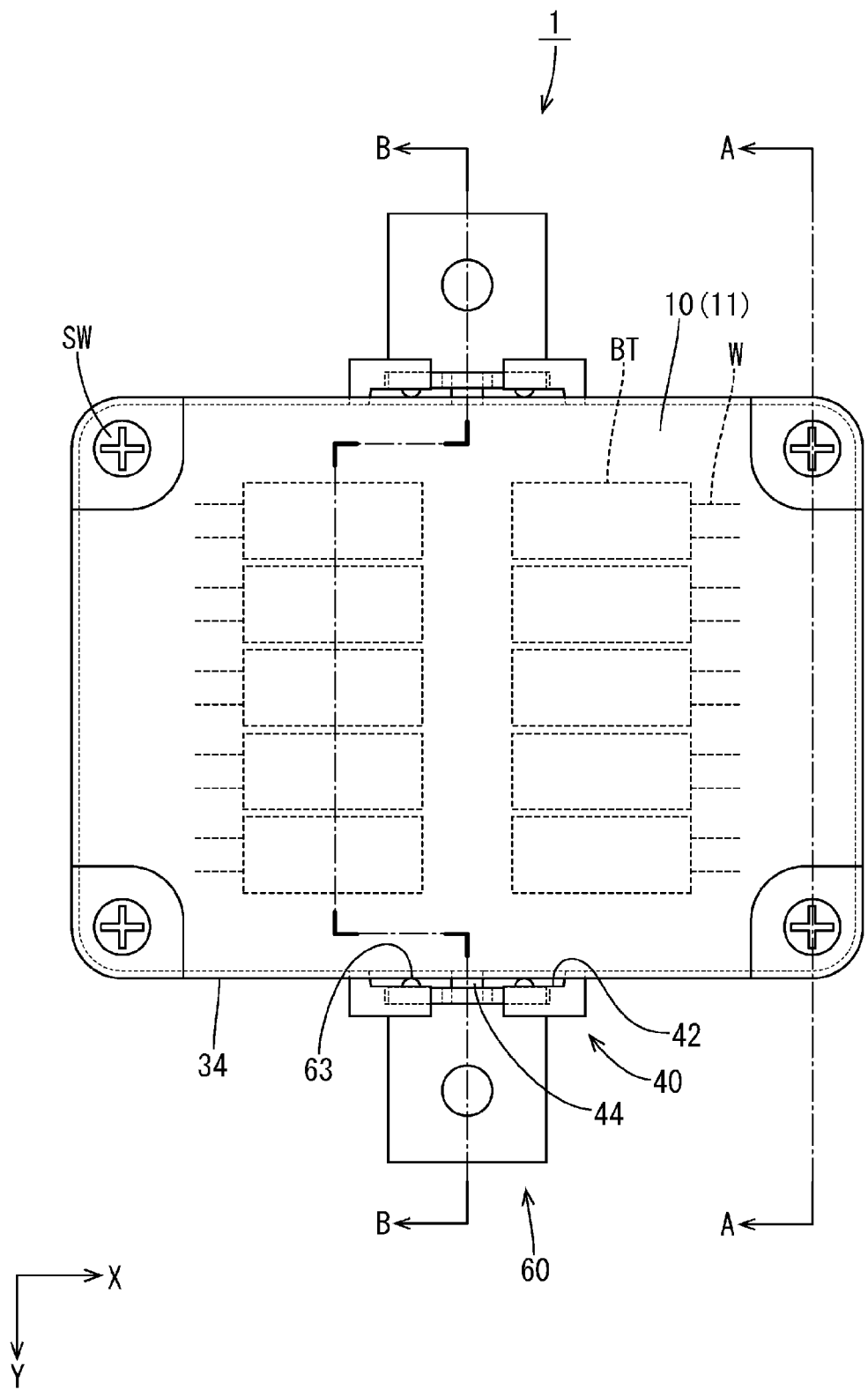
FIG. 1 is a top view of a power storage unit of Embodiment 1.

Embodiment 1 according to the technology disclosed in the present specification will be described using FIGS. 1 to 6.

A power storage unit 1 of the present embodiment is to be installed in a vehicle and used as an auxiliary power supply when the engine stops at idle and when the engine restarts, for example. In the following description, a direction X in the drawings is taken as the right side, a direction Y as the front side, and a direction Z as the upper side. Also, in the following description, there are cases where only one of a plurality of identical members is denoted by a reference numeral, while the reference numeral is omitted with respect to the other members.

Figure 2:
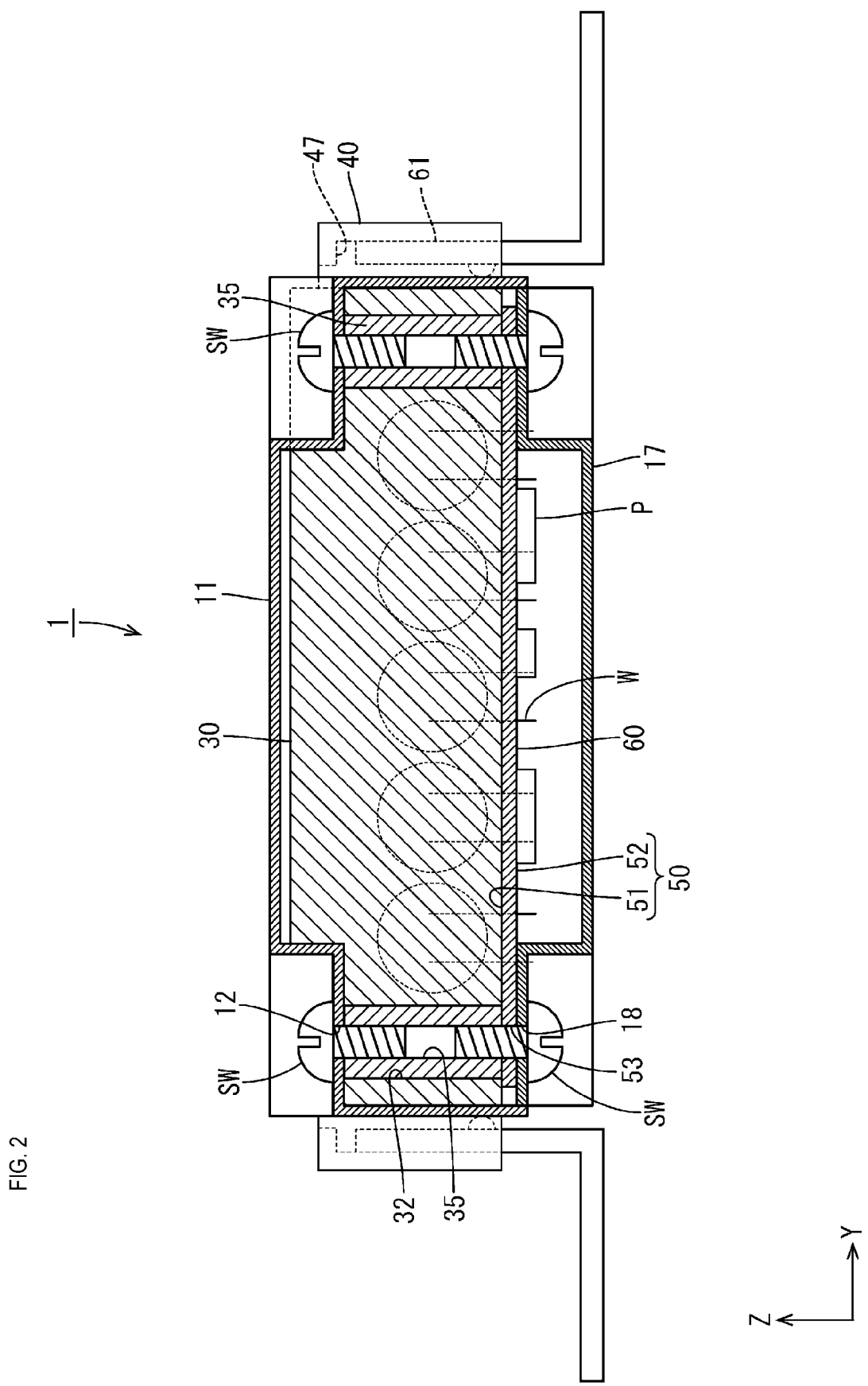
FIG. 2 is a cross-sectional view taken along line A-A in FIG. 1.
Figure 3:
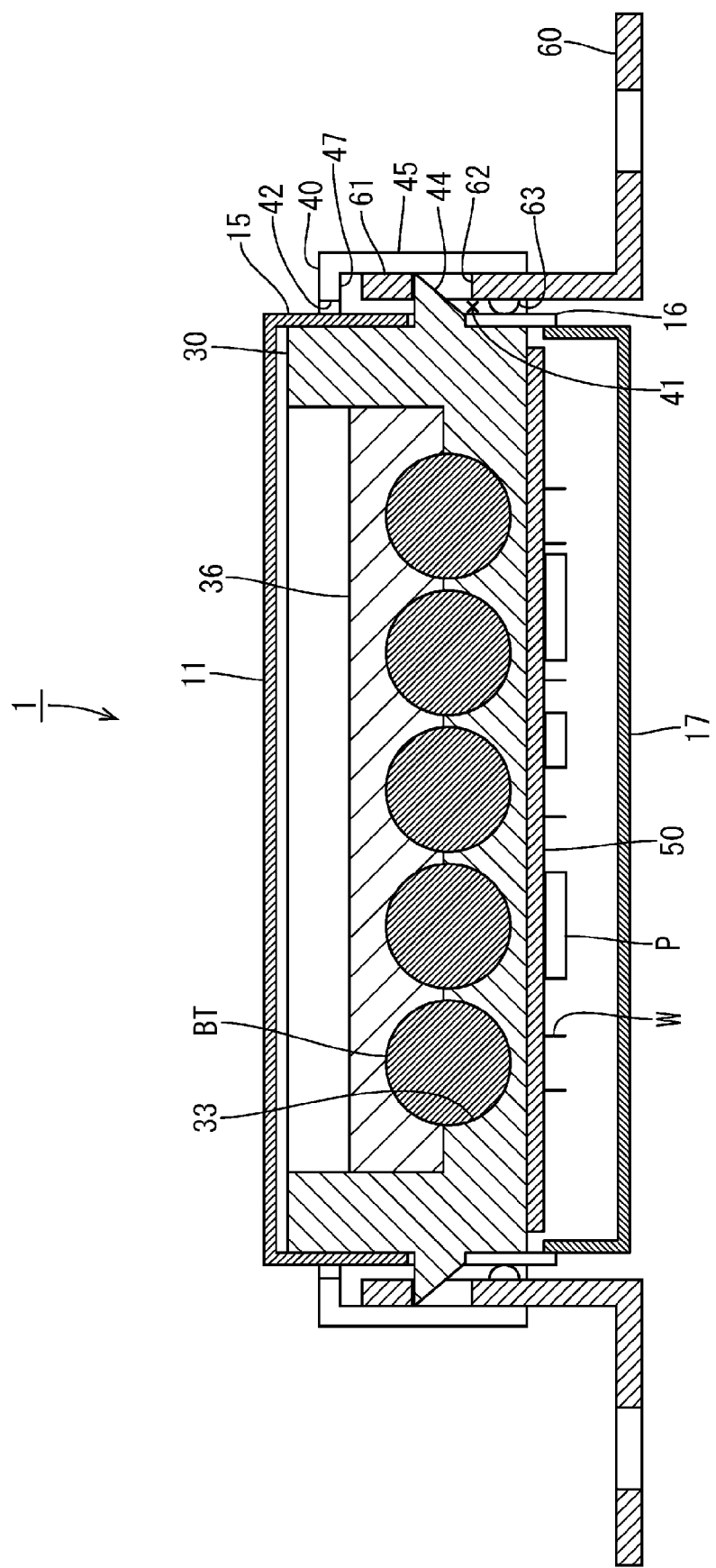
FIG. 3 is a cross-sectional view taken along line B-B in FIG. 1.

As shown in FIGS. 1 to 3, the power storage unit 1 includes a unit main body portion in which a holder 30 that holds a plurality of capacitors BT serving as power storage elements and a circuit board 50 to which an electronic component P (an example of a control circuit) for controlling the charging and discharging of the capacitors BT is mounted are housed in a metal case 10, as well as a pair of brackets 60 for attaching the unit main body portion to the vehicle, the brackets 60 being provided on the front side and the rear side, respectively, of the unit main body portion. Note that the power storage elements may also be secondary batteries.

As shown in FIG. 2, the metal case 10 includes an upper case 11 having a substantially rectangular parallelepiped shape with a recessed portion that is open downward and a lower case 17 having a flat, substantially rectangular parallelepiped shape with a recessed portion that is open upward. Vertically penetrating upper through-holes 12 are formed in the four corners of the upper case 11, and vertically penetrating lower through-holes 18 are formed in the four corners of the lower case 17.

The holder 30 is made of an insulating synthetic resin material, and, as a whole, has a flat rectangular box-like shape that is elongated in the left-right direction. The holder 30 has such dimensions that allow the holder 30 to fit tightly in the upper case 11. Vertically penetrating holder through-holes 32 are formed in the four corners of the holder 30. A metal collar 35 (an example of a coupling member) having a thread groove, which is not shown, formed in its inner circumferential surface is provided in each of the holder through-holes 32, and upper and lower end surfaces thereof are exposed.

A plurality of recessed portions 33 for housing the capacitors BT are provided on an upper surface side of the holder 30 such that, as shown in FIG. 1, a single row of recessed portions 33 that are lined up in the front-rear direction is formed on each of the left and right sides of the center line of the holder 30 in the length direction thereof.

The capacitors BT are housed in the respective recessed portions 33 of the holder 30, with their lead terminals W facing outward on the left or right side. As shown in FIG. 3, the capacitors BT housed in the holder 30 are covered by a holder cover 36. The holder cover 36 is fixed to the holder 30 by being engaged with an engagement portion, which is not shown, provided in the holder 30. The holder cover 36 is made of a synthetic resin material and has a shape that slopes from end portions toward the middle in the front-rear direction, and thus, the capacitors BT are prevented from coming out upward.

Note that the lead terminals W of the capacitors BT vertically pass through the holder 30, and are extended to a back surface side thereof as indicated by the dashed lines in FIG. 2.

The circuit board 50 is formed into a substantially oblong shape that is slightly smaller than a lower surface of the holder 30. As shown in FIG. 2, the circuit board 50 is disposed with an upper surface 51 thereof being in contact with the back surface of the holder 30, and the electronic component P for controlling the charging and discharging of the capacitors BT is mounted to a lower surface 52 thereof. Moreover, the circuit board 50 has board through-holes 53 penetrating the circuit board 50, and lands, which are not shown, are provided on the upper surface 51 of the circuit board 50 at circumferential edges of the respective board through-holes 53, and connected to a ground pattern (an example of a predetermined line). The lands and the board through-holes 53 have an inner diameter that is approximately equal to the inner diameter of the collars 35 provided in the holder 30, and upper surfaces of the lands are in contact with the lower surfaces of the respective collars 35. The lower surface 52 of the circuit board 50 is covered by the lower case 17 of the metal case 10.

As shown in FIG. 3, the power storage unit 1 has, on each of the front end side and the rear end side thereof, a configuration in which, due to a bracket 60 being attached to the holder 30, the load of the unit main body portion can be transmitted to the bracket 60, and the metal case 10, the holder 30, and the circuit board 50 can be electrically connected to the bracket 60. Since the configuration on the front end side and the configuration on the rear end side are identical except that these configurations are the reverse of each other on the front and rear sides, only the configuration on the front end side will be described below, and a description of the configuration on the rear end side is omitted.

Figure 4:
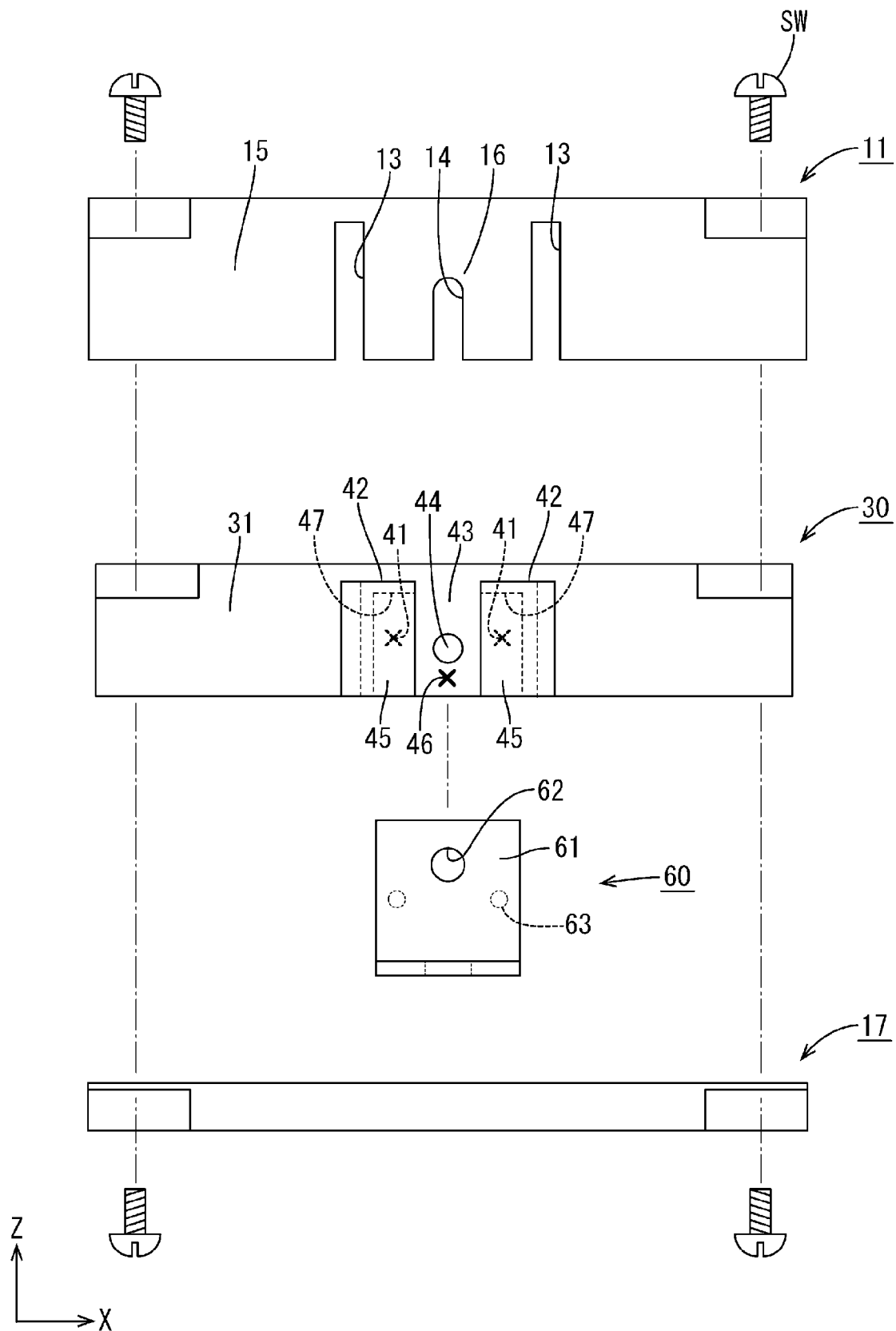
FIG. 4 is an exploded front view of the power storage unit.

A contact piece 16 (an example of a connection portion) that is to be electrically connected to the bracket 60 is provided in a front side wall 15 of the upper case 11. As shown in FIG. 4, the contact piece 16 is formed by cutting slits 13 in the front side wall 15 symmetrically about the center line of the front side wall 15 in the length direction thereof, and leaving a tab-like portion therebetween uncut. Provided at a middle portion of the contact piece 16 in the left-right direction is an escape slit 14 for allowing a locking projection 44 to pass through when the contact piece 16 is inserted into a bracket receiving portion 40, which will be described later. An upper end portion of the escape slit 14 has a circular arc shape that conforms to the shape of an outer circumferential surface of the locking projection 44.

As shown in FIG. 3, the bracket 60 is made of a metal material having a relatively large wall thickness, and has a belt-like shape. A leading end portion of the bracket 60 is bent at a right angle in the length direction thereof and constitutes an insertion piece portion 61 that is to be engaged with the bracket receiving portion 40, which will be described later. As shown in FIG. 4, a locking hole 62 penetrating the insertion piece portion 61 is formed near an end portion of the insertion piece portion 61. Moreover, contact projections 63 each having a semispherical shape are provided projecting from a rear surface of the insertion piece portion 61. The contact projections 63 are provided lower than the locking hole 62, and arranged one at each of two locations that are symmetrical to each other about the center line of the insertion piece portion 61 in a width direction thereof.

The bracket receiving portion 40 that is to be engaged with the bracket 60 is provided projecting from the middle of a front side surface 31 of the holder 30 in the left-right direction.

As shown in FIGS. 1 and 4, the bracket receiving portion 40, as a whole, has a substantially rectangular parallelepiped shape that is flat in the front-rear direction. A pair of holding groove portions 41 that are open into a lower surface are formed in the bracket receiving portion 40, and insertion slits 42 that are in communication with the holding groove portions 41 are formed in an upper surface of the bracket receiving portion 40 at locations near the front side surface 31 of the holder 30. The insertion slits 42 have such dimensions that allow the contact piece 16 to be inserted therein.

A front wall portion 45 of the bracket receiving portion 40 has a front opening 46 that is in communication with the holding groove portions 41, the front opening 46 being formed along the center line of the front wall portion 45 in the left-right direction. On the other hand, the locking projection 44 having a small cylindrical shape is provided projecting forward from a middle portion of a rear inner wall 43 (front side surface 31 of the holder 30) of the holding groove portions 41. The locking projection 44 extends to the inside, or the vicinity, of the front opening 46, and a leading end thereof constitutes a free end without being coupled to inner wall surfaces of the holding groove portions 41 and an inner wall surface of the front opening 46.

Next, a procedure for assembling the power storage unit 1 of the present embodiment will be described.

First, the circuit board 50 and the holder 30 are housed in the metal case 10, and the upper case 11 and the lower case 17 are fitted to each other. As a result, the contact piece 16 of the upper case 11 is inserted into the holding groove portions 41 through the insertion slits 42, and is disposed therein with its rear surface extending in contact with the rear inner wall 43 (front side surface 31 of the holder 30) of the holding groove portions 41 and its front surface being exposed in the holding groove portions 41, while allowing the locking projection 44 to pass through the escape slit 14.

Moreover, when housing the circuit board 50 and the holder 30 in the metal case 10, the metal collars 35, which are provided in the four corners of the holder 30, as well as the lands and the board through-holes 53, which are provided in the four corners of the circuit board 50, are aligned in advance so as to be coaxial with the upper through-holes 12 and the lower through-holes 18, which are provided in the four corners of the metal case 10. Then, screws SW serving as fastening members are inserted into these through-holes from the upper side and the lower side of the metal case 10 and screwed into the threaded holes of the metal collars 35. Thus, the circuit board 50 and the metal case 10 are fixed to the holder 30, electrical conduction is established between the ground pattern of the circuit board 50 and the metal collars 35 via the lands, and the upper case 11 and the lower case 17 are electrically connected to the metal collars 35 via the screws SW.

Figure 5:
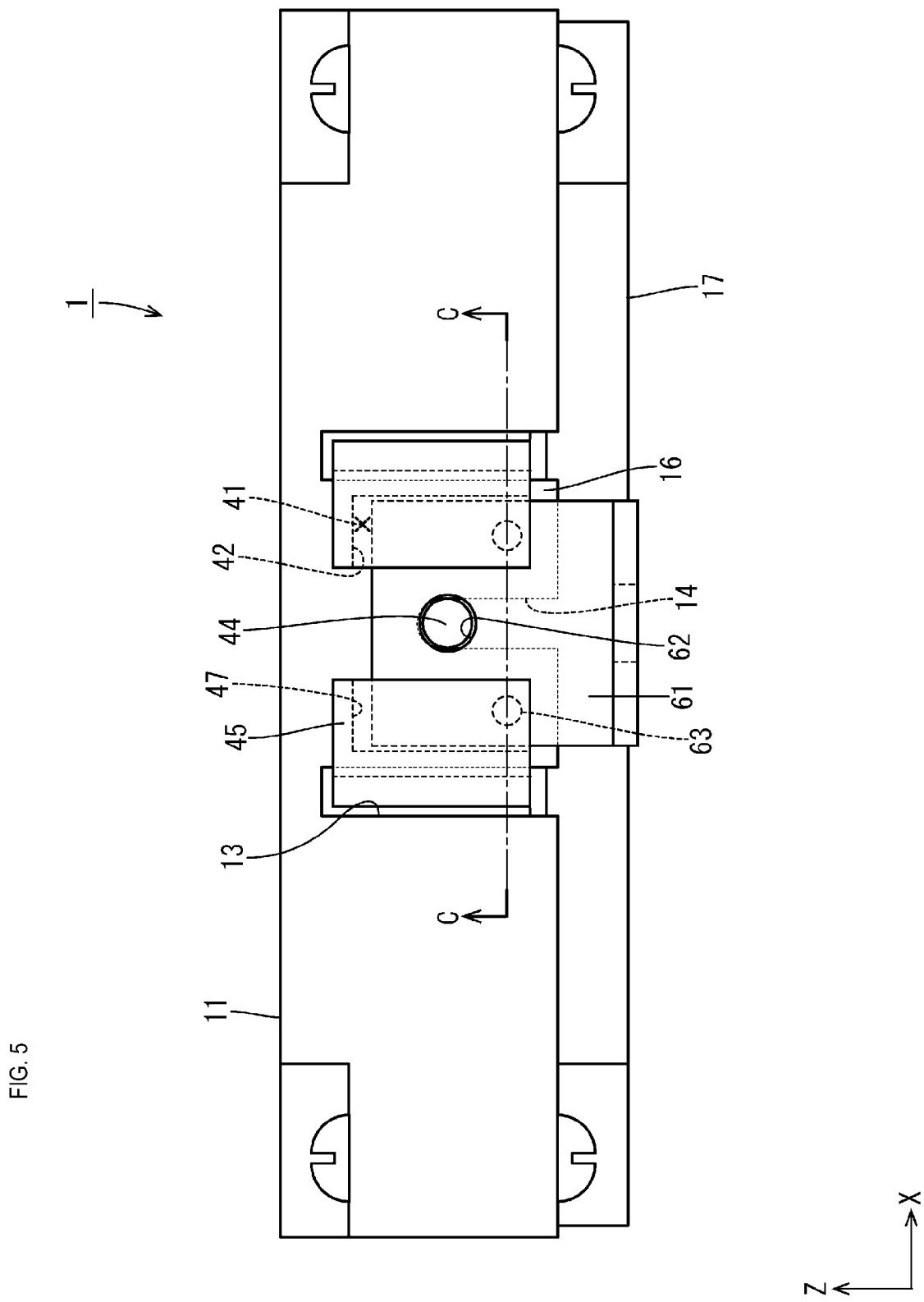
FIG. 5 is a front view showing a state in which a bracket is held in a bracket receiving portion.
Figure 6:
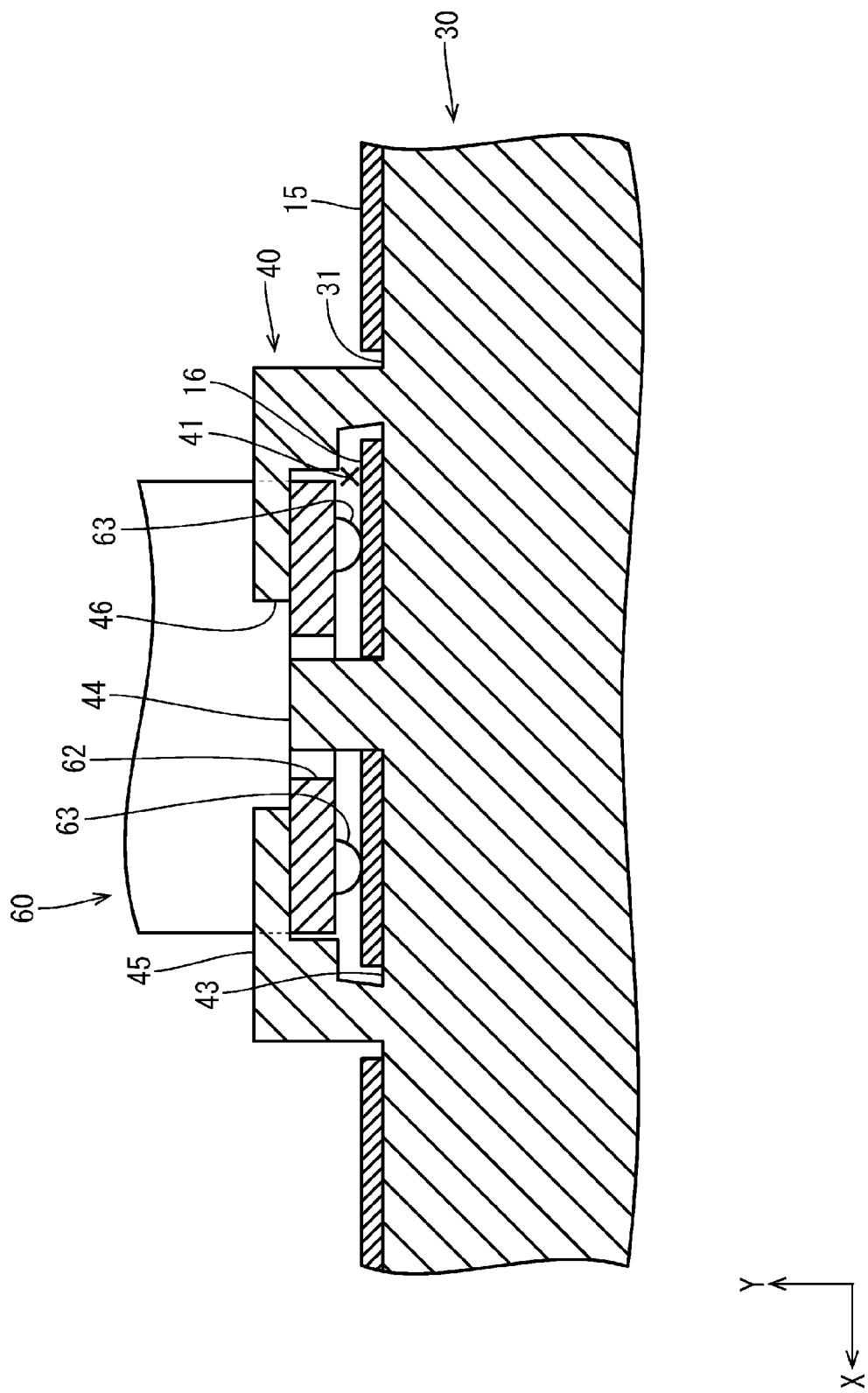
FIG. 6 is a cross-sectional view taken along line C-C in FIG. 5.

Then, the insertion piece portion 61 of the bracket 60 is inserted into the holding groove portions 41 from the lower side, and moved upward in the holding groove portions 41 while causing the locking projection 44 to elastically deform upward and causing the contact projections 63 to come into frictional contact with the front surface (exposed surface) of the contact piece 16. As a result, the locking projection 44 fits into the locking hole 62 of the insertion piece portion 61 and elastically returns to its original position. Thus, as shown in FIGS. 3 and 5, the bracket 60 (insertion piece portion 61) is surrounded by inner walls of the holding groove portions 41, with its leading end being able to abut against top surfaces 47 of the inner walls of the holding groove portions 41, and is also locked by the locking projection 44 and, thus, engaged with and held in the bracket receiving portion 40. At the same time, as shown in FIG. 6, the contact projections 63 come into contact with the contact piece 16 of the metal case 10 and are thus electrically connected to the metal case 10.

In this manner, the holder 30 and the circuit board 50 are housed and fixed in the metal case 10, and the bracket receiving portion 40 of the holder 30 is engaged with the bracket 60. Consequently, a power storage module is completed in which all of the metal case 10, the holder 30, and the circuit board 50 are electrically connected to the bracket 60 and are at the same potential.

With the above-described configuration, the load of the capacitors BT is transmitted from the holder 30 to the bracket 60 that is engaged with the bracket receiving portion 40 of the holder 30. Unlike conventional configurations, the load is not transmitted to the bracket 60 via the metal case 10. Therefore, the generation of excessive stress in a joint portion between the metal case 10 and the bracket 60 can be prevented. Moreover, since the metal case 10 is provided with the contact piece 16 that is to be electrically connected to the bracket 60, the metal case 10 can be electrically connected to a vehicle body or the like of the vehicle via the bracket 60. The holder 30 need not be electrically connected to the bracket 60 and therefore need not be produced using a conductive material, and thus can be made of any material that is chosen with higher priority given to strength and production cost.

Moreover, the contact piece 16 of the metal case 10 is exposed within the holding groove portions 41, which are to hold the bracket 60, and therefore, can be electrically connected to the bracket 60 while the holder 30 is held by the bracket 60, by simply inserting the bracket 60 into the holding groove portions 41.

Embodiment 2

Next, Embodiment 2 according to the technology disclosed in the present specification will be described using FIGS. 7 to 10. Note that, in the present embodiment, only components that are different from those of the embodiment will be described, and a description of similar components to those of Embodiment 1 is omitted.

Figure 7:
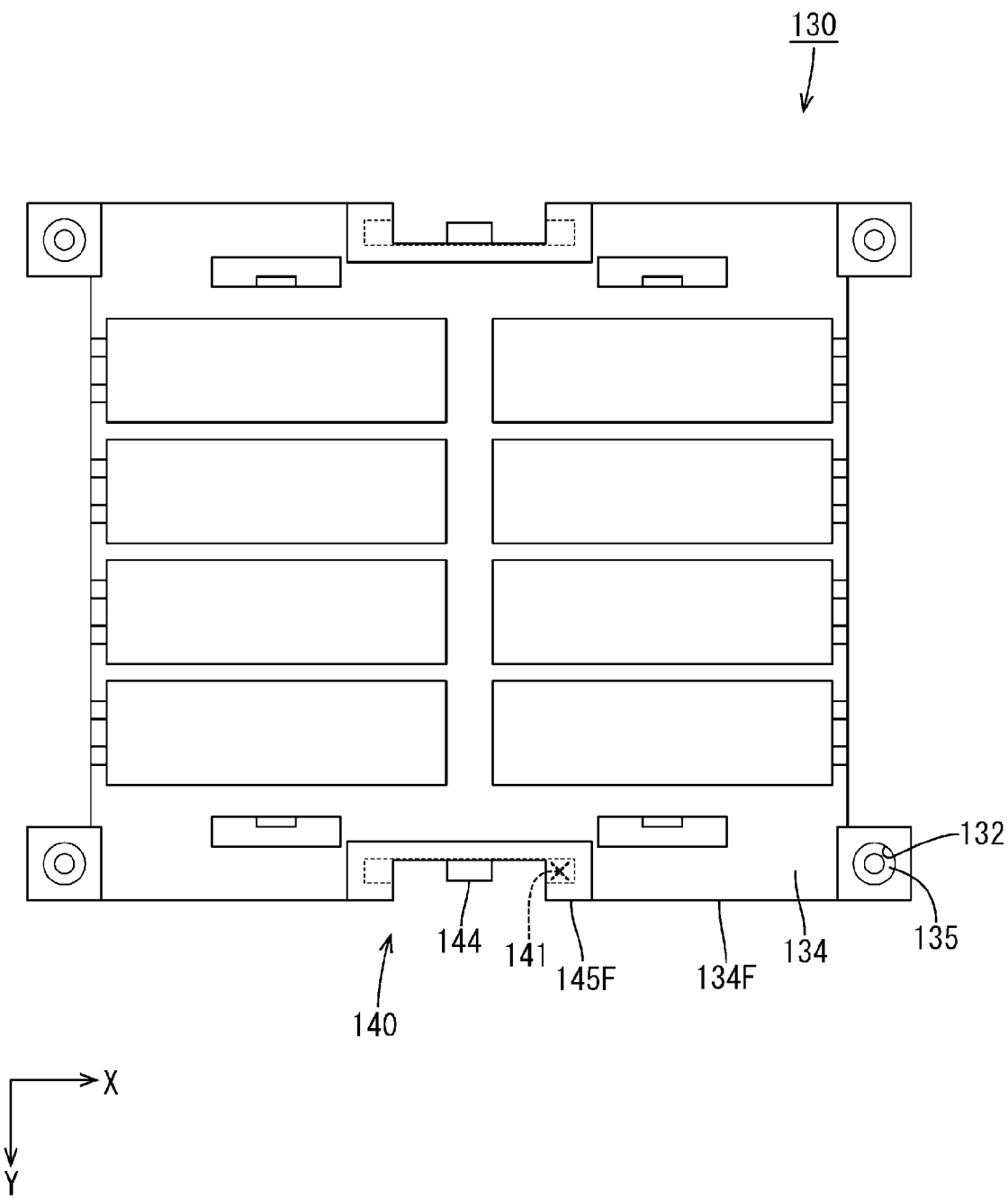
FIG. 7 is a top view of a holder of Embodiment 2.
Figure 8:
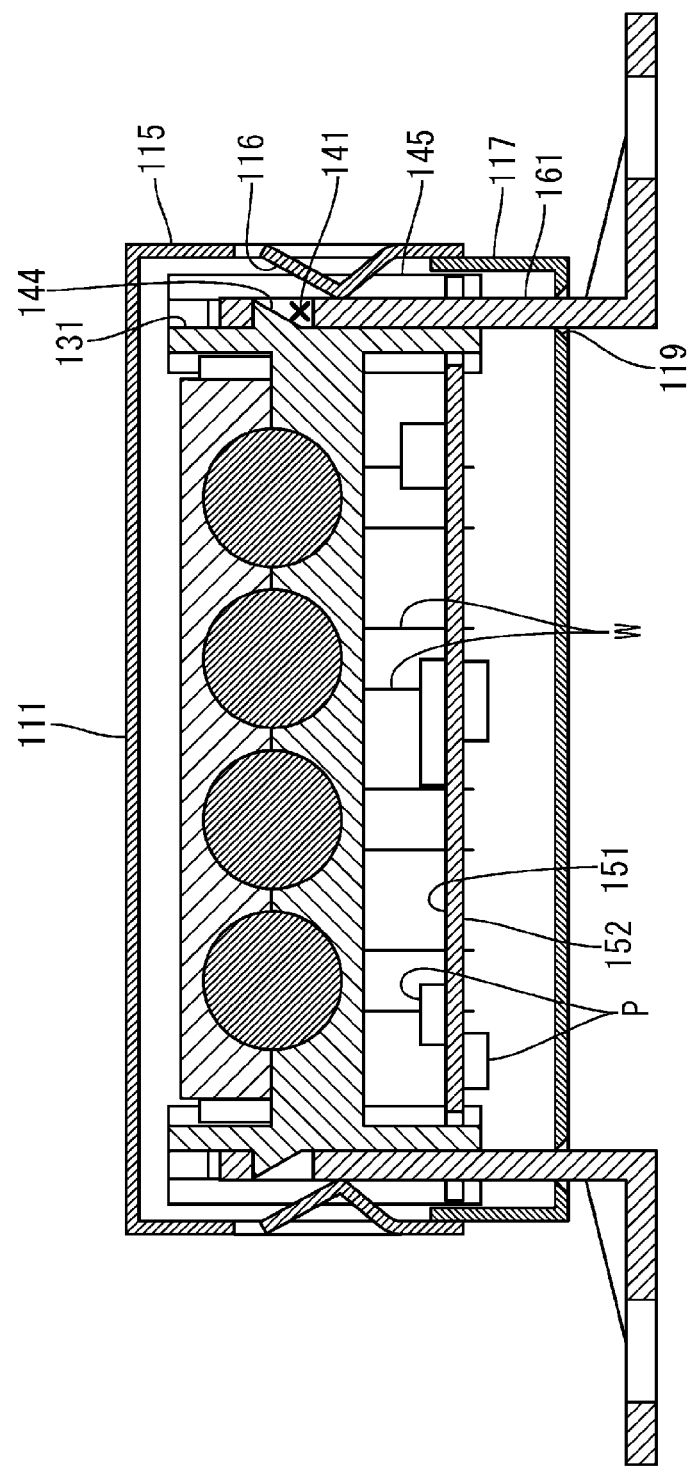
FIG. 8 is a cross-sectional view showing a state in which a bracket is held in a bracket receiving portion.

In the power storage unit 1 of Embodiment 1, the bracket receiving portion 40 is provided projecting from a front side portion 34 of the holder 30. In contrast, in a power storage unit 100 of the present embodiment, as shown in FIG. 7, a bracket receiving portion 140 is provided recessed in a front side portion 134 of a holder 130, as seen from above, with a front surface 145F of its front wall portion 145 being flush with a front surface 134F of the front side portion 134 of the holder 130. Thus, as shown in FIG. 8, the bracket receiving portion 140 is housed inside a metal case 110 that covers the holder 130. Note that electronic components are mounted to not only a lower surface 152 but also an upper surface 151 of a circuit board 150, and the circuit board 150 is disposed spaced apart from the lower surface of the holder 130. Vertically penetrating holder through-holes 132 are formed in the four corners of the holder 130. A metal collar 135 having a thread groove, which is not shown, formed in its inner circumferential surface is provided in each holder through-hole 132, and upper and lower end surfaces of the metal collar 135 are exposed.

Moreover, in the present embodiment, as shown in FIG. 8, a spring piece 116 projecting rearward is integrally provided in the middle of a front side wall 115 of an upper case 111, and constitutes a contact piece 116 (an example of the connection portion) that is to be brought into contact with a bracket 160. The spring piece 116 passes through a front opening 146 of the bracket receiving portion 140 from the front surface side thereof and is exposed in holding groove portions 141, and is also in contact with the bracket 160 inserted into the holding portion.

Figure 9:
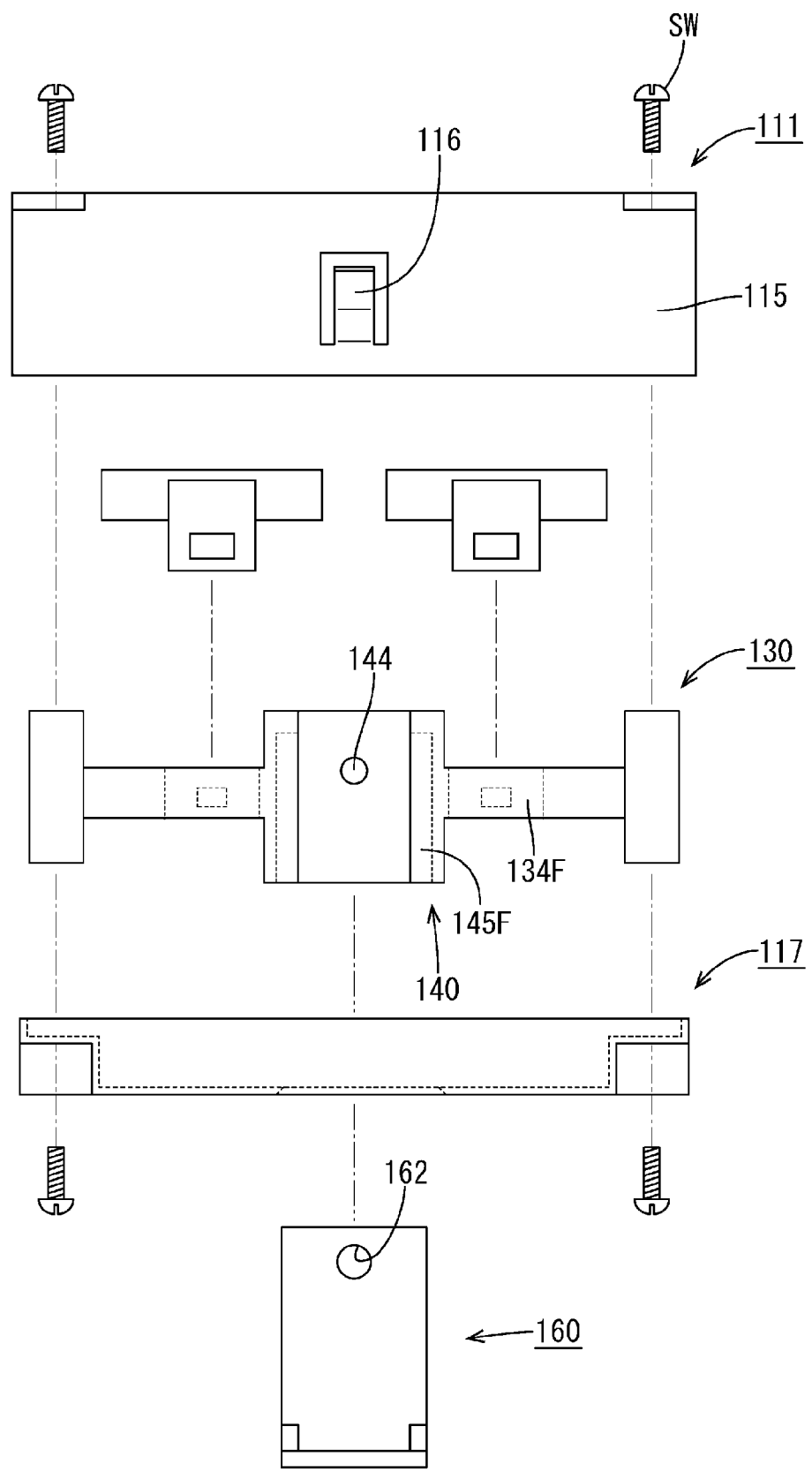
FIG. 9 is an exploded front view of a power storage unit.
Figure 10:
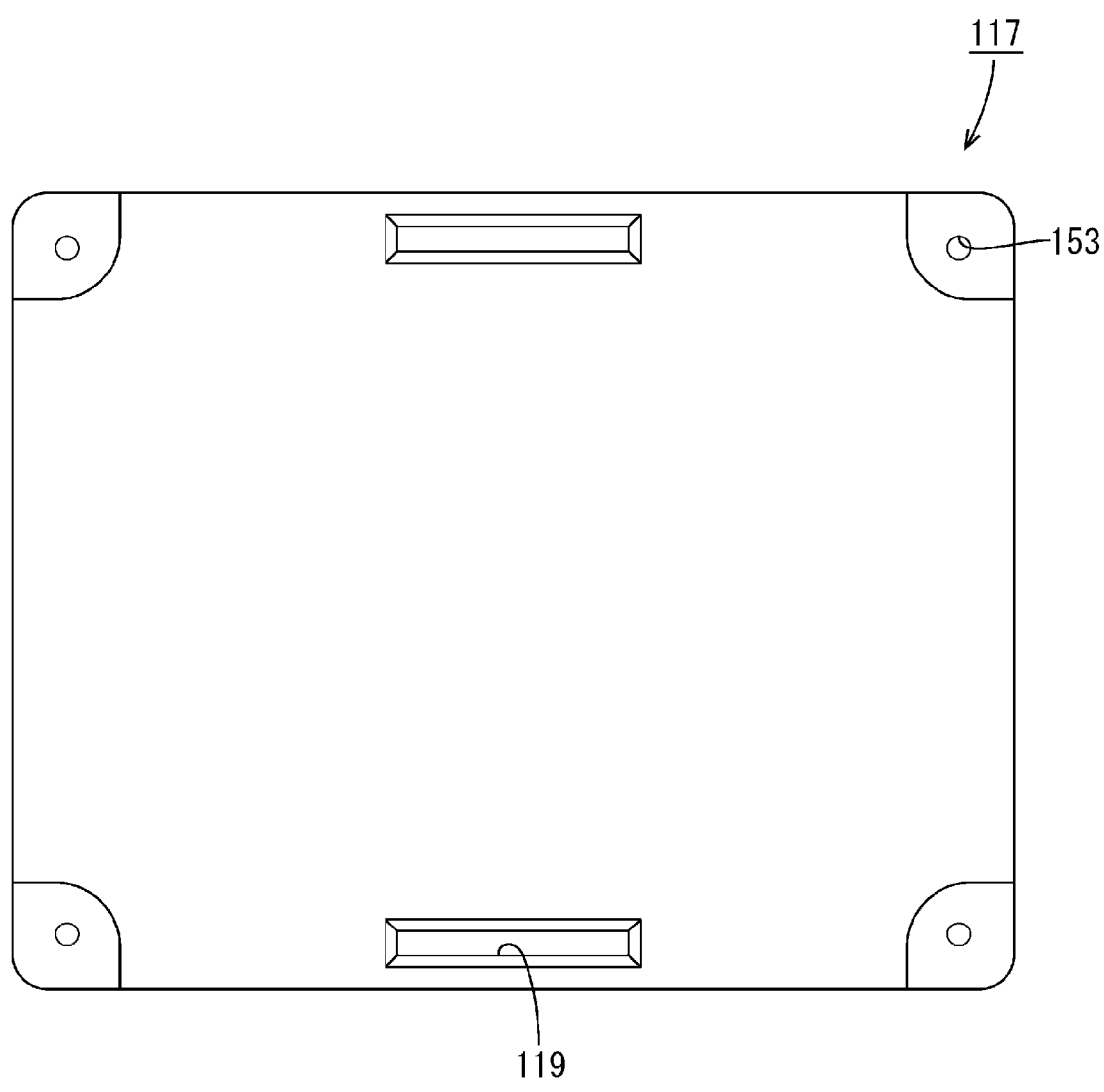
FIG. 10 is a top view of a lower case.

As shown in FIG. 10, a lower slit 119 that is long in the left-right direction is provided in the middle, and near a front end portion, of a lower case 117 of the metal case 110. As shown in FIGS. 8 and 9, an insertion piece portion 161 of the bracket 160 is inserted into the lower slit 119 from the lower side and then press-fitted into the holding groove portions 141 of the bracket receiving portion 140 within the metal case 110, and is thus brought into contact with the spring piece 116 that is exposed in the holding groove portions 141 from the front surface side thereof. A locking projection 144 is provided projecting forward from a middle portion of a front side surface 131 of the holder 130.

With this configuration, the bracket receiving portion 140 is housed inside the metal case 110, and is therefore prevented from deforming due to being pressed by another member from the outside. Accordingly, this configuration is suitable for cases where an installation space for the power storage module is small, and there is concern of abutment against another member that is caused by vibrations of the vehicle, for example.

Other Embodiments

The technology disclosed in the present specification is not limited to the embodiments that have been described so far with reference to the drawings, and can be implemented in the following forms, for example.

(1) In the above-described embodiment, a configuration is adopted in which the holding groove portions 41 for the bracket 60 are open downward, and the bracket 60 is inserted from the lower side. However, the direction in which a holding groove portion is open is not limited to this direction. For example, a configuration may also be adopted in which a holding groove portion is open leftward, and a bracket is inserted from the left side.

(2) Moreover, in the above-described embodiment, the holding groove portions 41 provided within the bracket receiving portion 40 are not partitioned into a region where the contact piece 16 is to be disposed and a region where the insertion piece portion 61 is to be disposed, but the holding groove portions are not limited to this configuration. For example, a configuration may also be adopted in which a partition wall is provided between a region where a contact piece is to be disposed and a region where an insertion piece portion is to be disposed, and an opening through which a contact projection is inserted from one of the regions to the other region is formed in this partition wall.

(3) The shape of the contact piece portion is not limited to shapes such as those shown in the above-described embodiments. Also, the contact piece portion may be provided either in the metal case or in the bracket. For example, in Embodiment 1, the contact projections are provided in the bracket, but a contact projection may also be provided in the contact piece. Moreover, in Embodiment 2, the spring piece 116 provided in the front side wall 115 of the metal case enters the holding groove portions 141 through the front opening 146, but instead of this configuration, a configuration may also be adopted in which a projecting portion that projects forward is provided on the front surface side of an insertion piece portion, and this projecting portion projects to the outside from the front opening and comes into contact with the front side wall portion of a metal case. Furthermore, contact projections are not necessarily required. In short, it is sufficient that the bracket and the metal case are brought into contact with each other and electrically connected to each other.

(4) In the above-described embodiment, the holder 30, which holds the power storage elements, and the circuit board 50 are housed in the metal case 10, but the disclosure of the present application is not limited to this and can also be applied to a power storage unit in which only a holder that holds a power storage element is housed in a metal case.

(5) The structure for fixing the upper case and the lower case to the holder while electrically connecting these cases is not limited to a structure, such as that of Embodiment 1 above, in which a screw is screwed into a metal collar, and, for example, a structure may also be adopted in which a metal stay having threaded portions on both ends is used as a coupling member that replaces the metal collar, and nuts serving as fastening members are screwed thereonto. Alternatively, it is also possible to adopt a structure in which threaded portions are formed in the lower through-holes of the lower case through burring, and screws inserted from the upper through-holes of the upper case are screwed therein; a structure in which a bolt is fastened with a self-clinching nut; or the like.

The invention claimed is:

1. A power storage unit in which a power storage element is housed in a metal case and which is to be attached to a vehicle via a metal bracket, the power storage unit comprising:
   a holder that holds the power storage element within the metal case;
   a bracket receiving portion that is provided in the holder and is to be engaged with the bracket and transmit a load of the holder and the power storage element to the bracket; and
   a connection portion that is provided in the metal case and is to come into contact with the bracket and electrically connect the metal case to the bracket,
   wherein the bracket receiving portion includes a holding groove portion into which an insertion piece portion provided at a leading end of the bracket can be inserted.

2. The power storage unit according to claim 1, wherein, the connection portion is constituted by a contact piece provided integrated with the metal case, and the contact piece is exposed in the holding groove portion and can come into contact with the insertion piece portion of the bracket inserted and held in the holding groove portion.

3. The power storage unit according to claim 2, wherein the bracket receiving portion is provided recessed in a side portion of the holder, the metal case is provided with a wall portion that covers a side wall of the holder from an outer side, the wall portion is provided with a spring piece serving as the contact piece, and the spring piece can enter the holding groove portion from the outer side of the side wall and come into contact with the insertion piece portion of the bracket.

4. The power storage unit according to claim 3, wherein the metal case is constituted by an upper case and a lower case that cover the outside of the holder by being fitted to each other from opposite sides, the holder is provided with a metal coupling member extending in a direction in which the upper and lower cases are fitted to each other, and the upper case and the lower case are fixed to the holder using a fastening member screwed to the coupling member.

5. The power storage unit according to claim 3, wherein the holder is made of a synthetic resin and has a rectangular box-like shape, and the bracket receiving portion is provided in substantially the middle of each of opposite side wall portions corresponding to the long sides of the holder.

6. The power storage unit according to claim 2, wherein the metal case is constituted by an upper case and a lower case that cover the outside of the holder by being fitted to each other from opposite sides, the holder is provided with a metal coupling member extending in a direction in which the upper and lower cases are fitted to each other, and the upper case and the lower case are fixed to the holder using a fastening member screwed to the coupling member.

7. The power storage unit according to claim 2, wherein the holder is made of a synthetic resin and has a rectangular box-like shape, and the bracket receiving portion is provided in substantially the middle of each of opposite side wall portions corresponding to the long sides of the holder.

8. The power storage unit according to claim 1, wherein the metal case is constituted by an upper case and a lower case that cover the outside of the holder by being fitted to each other from opposite sides, the holder is provided with a metal coupling member extending in a direction in which the upper and lower cases are fitted to each other, and the upper case and the lower case are fixed to the holder using a fastening member screwed to the coupling member.

9. The power storage unit according to claim 8, wherein a circuit board to which a control circuit that controls charging and discharging of the power storage element is mounted is housed in the metal case, and the circuit board has a through-hole through which the coupling member passes and a land at a circumferential edge of the through-hole, the land being in contact with the coupling member and thereby allowing a predetermined line of the control circuit to be at the same potential as the metal case.

10. The power storage unit according to claim 9, wherein the holder is made of a synthetic resin and has a rectangular box-like shape, and the bracket receiving portion is provided in substantially the middle of each of opposite side wall portions corresponding to the long sides of the holder.

11. The power storage unit according to claim 8, wherein the holder is made of a synthetic resin and has a rectangular box-like shape, and the bracket receiving portion is provided in substantially the middle of each of opposite side wall portions corresponding to the long sides of the holder.

12. The power storage unit according to claim 1, wherein the holder is made of a synthetic resin and has a rectangular box-like shape, and the bracket receiving portion is provided in substantially the middle of each of opposite side wall portions corresponding to the long sides of the holder.

* * * * *